US006711687B1

United States Patent
Sekiguchi

(10) Patent No.: US 6,711,687 B1
(45) Date of Patent: Mar. 23, 2004

(54) SECURITY MONITORING APPARATUS BASED ON ACCESS LOG AND METHOD THEREOF

(75) Inventor: Minoru Sekiguchi, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/336,765

(22) Filed: Jun. 21, 1999

(30) Foreign Application Priority Data

Nov. 5, 1998 (JP) ............................................. 10-314134

(51) Int. Cl.[7] ............................ G06F 11/30; H04L 9/100
(52) U.S. Cl. ........................ 713/201; 713/186; 713/200; 713/202
(58) Field of Search ................................. 713/186, 200, 713/201, 202

(56) References Cited

U.S. PATENT DOCUMENTS 4,816,658 A * 3/1989 Khandwala et al. ........ 235/382
5,475,839 A * 12/1995 Watson et al. ................. 713/2
5,960,172 A * 9/1999 Hwang ........................ 713/200
6,185,316 B1 * 2/2001 Buffam ........................ 382/115

FOREIGN PATENT DOCUMENTS

| JP | 2-230836 | 9/1990 |
| JP | 4-235657 | 8/1992 |
| JP | 6-332826 | 12/1994 |

* cited by examiner

Primary Examiner—Thomas R. Peeso
Assistant Examiner—G. Gurshman
(74) Attorney, Agent, or Firm—Staas & Halsey, LLP.

(57) ABSTRACT

A security monitoring apparatus monitors access to a monitor target from the outside, and judges whether new access is normal by referring to an access log concerning past access situations. Then, if the access is abnormal, the security monitoring apparatus issues an alarm to a user/manager, and executes a lockout process, etc.

12 Claims, 21 Drawing Sheets

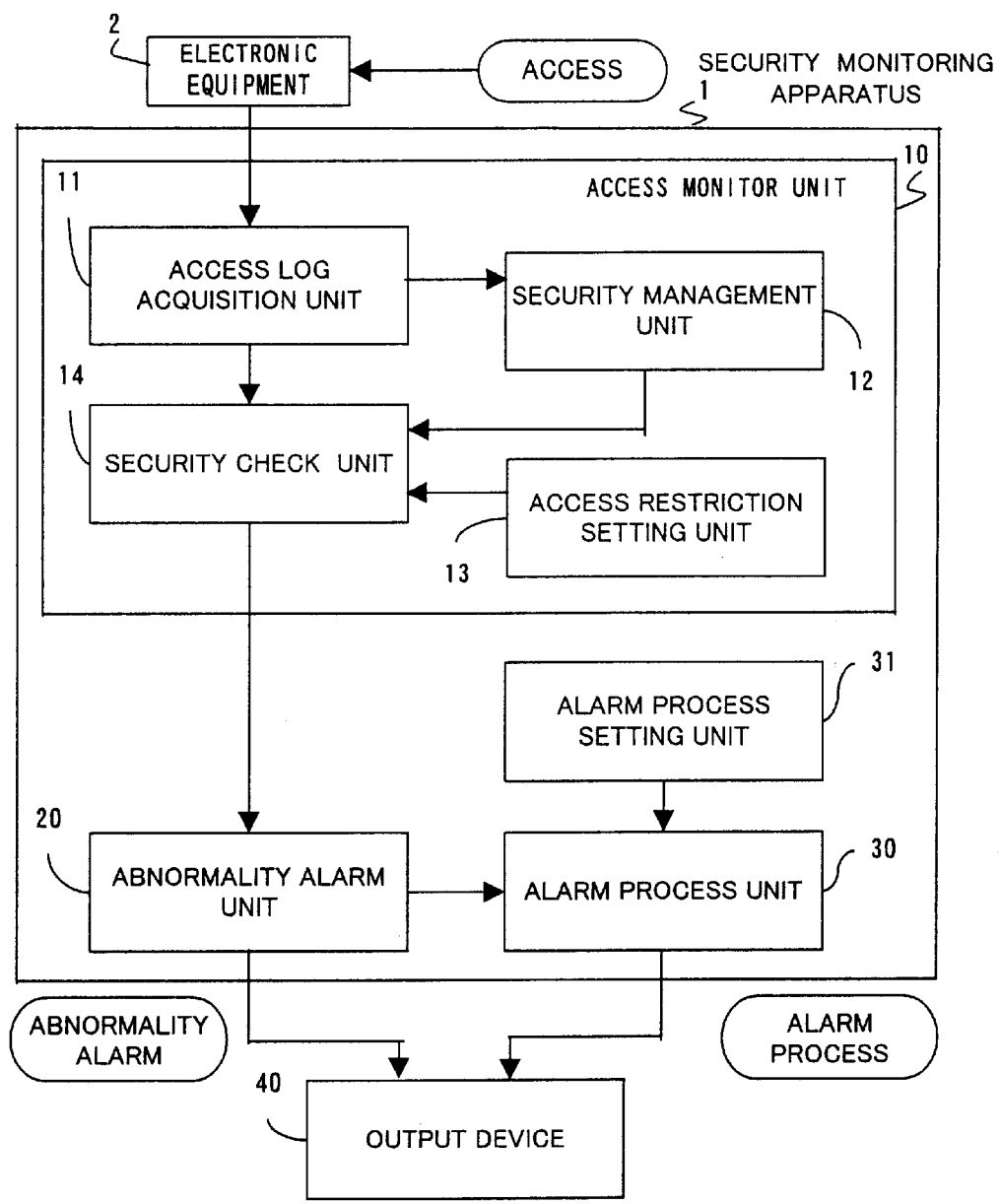
F I G. 1

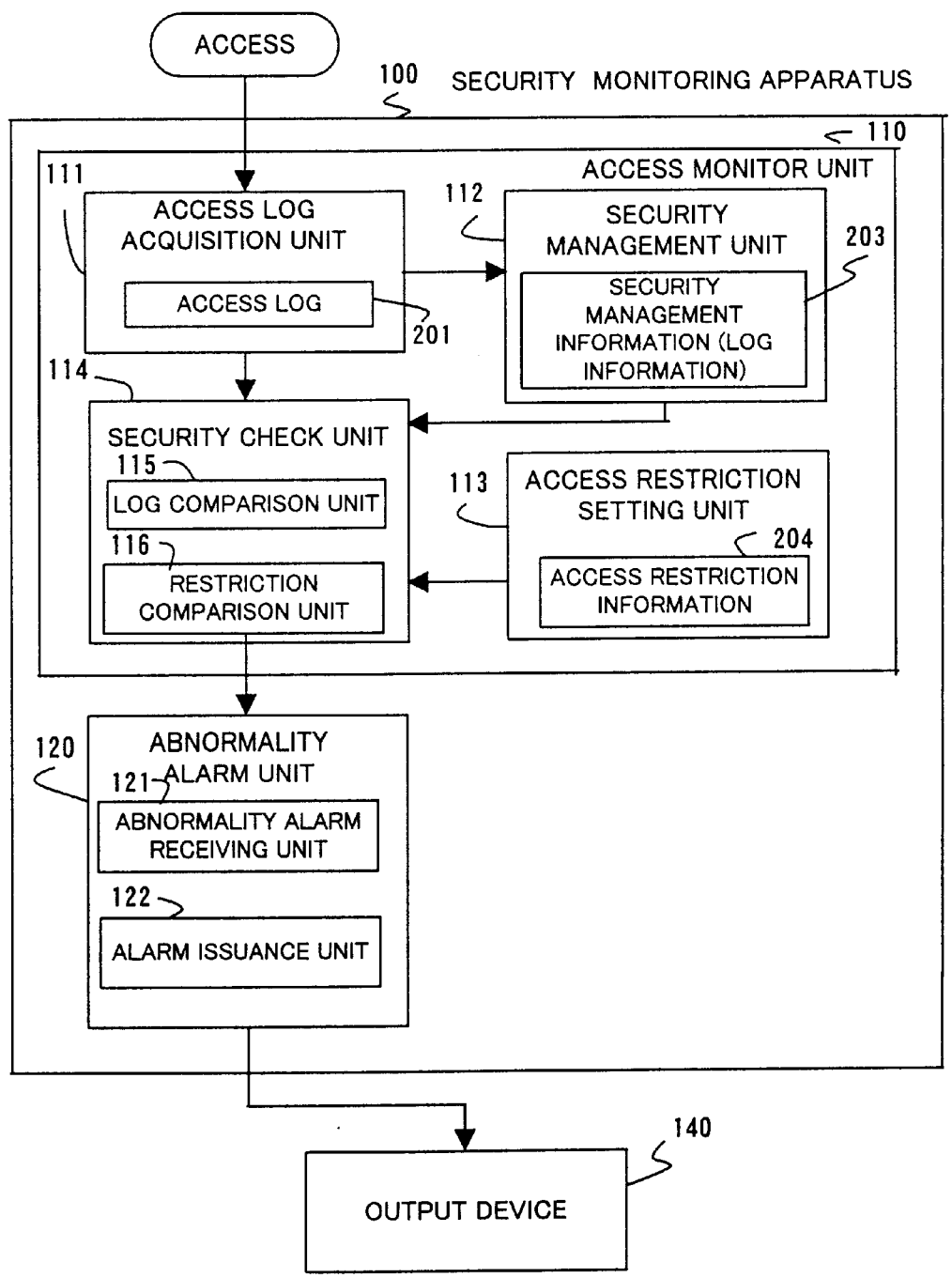
F I G. 2

ACCESS LOG OF user A                    201

NAME OF USER : userA
PASSWORD : paswd!#$123
DATE OF ACCESS: 1998/8/25 18:30:34
NAME OF ACCESSED FILE : file1.txt: 1998/8/25 18:32:34
                       file2.txt: 1998/8/25 18:33:20

NAME OF EXECUTED COMMAND: exec.exe: 1998/8/25 18:32:20

FIG. 3

SECURITY MANAGEMENT INFORMATION 203

```
NAME OF USER : userA
PASSWORD : paswd!#$123
NUMBER OF TIMES OF ACCESS : 123
DATE AND TIME OF ACCESS : FIRST: 1996/4/25 10:30:34, PREVIOUS: 1998/8/24 10:32:34, TIME ZONE: 10:00:00-19:00:00
NAME OF ACCESSED FILE :
   file1.txt : FIRST: 1997/8/25 12:32:34, PREVIOUS: 1998/8/25 17:30:34, NUMBER OF TIMES: 22, TIME ZONE: 12:00:00-17:30:34
   file2.txt : FIRST: 1997/8/30 10:32:34, PREVIOUS: 1998/8/25 17:32:34, NUMBER OF TIMES: 12, TIME ZONE: 10:00:00-17:32:34
   exec.exe : FIRST: 1997/8/30 10:32:34, PREVIOUS: 1998/8/25 18:32:20, NUMBER OF TIMES: 62, TIME ZONE: 10:00:00-19:30:34
   ...
NAME OF EXECUTED COMMAND
   exec.exe : FIRST: 1997/8/30 10:32:34, PREVIOUS: 1998/8/25 18:32:20, NUMBER OF TIMES: 62, TIME ZONE: 10:00:00-19:30:34
   com.exe : FIRST: 1997/8/31 10:32:34, PREVIOUS: 1998/8/25 18:22:20, NUMBER OF TIMES: 105, TIME ZONE: 10:00:00-19:30:34
   ...
COMPUTER TO GAIN ACCESS
   comp1, comp2, comp3
   ...
```

FIG. 4

SECURITY MANAGEMENT INFORMATION 203

NAME OF COMPUTER : compB
REGISTERED USER : userA, userB, ...
NAME OF ACCESSED FILE :
   file1.txt : FIRST: 1997/8/25 12:32:34, PREVIOUS: 1998/8/25 17:30:34, NUMBER OF TIMES: 222, TIME ZONE: 12:00:00–17:30:34
   file2.txt : FIRST: 1997/8/30 10:32:34, PREVIOUS: 1998/8/25 17:32:34, NUMBER OF TIMES: 122, TIME ZONE: 10:00:00–17:32:34
   exec.exe : FIRST: 1996/5/31 10:32:34, PREVIOUS: 1998/8/27 15:22:50, NUMBER OF TIMES: 305, TIME ZONE: 10:00:00–15:30:34
   ...
NAME OF EXECUTED COMMAND
   exec.exe : FIRST: 1997/8/30 10:32:34, PREVIOUS: 1998/8/25 18:32:20, NUMBER OF TIMES: 642, TIME ZONE: 10:00:00–19:30:34
   com.exe : FIRST: 1996/5/31 10:32:34, PREVIOUS: 1998/8/27 15:22:50, NUMBER OF TIMES: 305, TIME ZONE: 10:00:00–15:30:34
   ...
COMPUTER TO GAIN ACCESS
   comp1: FIRST: 1995/3/30 15:22:34, PREVIOUS: 1998/8/22 15:32:20, NUMBER OF TIMES: 542, TIME ZONE: 15:00:00–16:00:00
   comp2: FIRST: 1995/4/3 15:32:23, PREVIOUS: 1998/8/25 18:32:30, NUMBER OF TIMES: 542, TIME ZONE: 15:00:00–19:00:34
   ...
COMPUTER TO BE ACCESSED
   comp1: FIRST: 1995/3/30 15:32:34, PREVIOUS: 1998/8/20 15:32:20, NUMBER OF TIMES: 542, TIME ZONE: 15:00:00–17:00:34
   comp2: FIRST: 1996/5/20 20:32:35, PREVIOUS: 1998/8/25 18:32:20, NUMBER OF TIMES: 344, TIME ZONE: 18:00:00–22:30:34
   server1: FIRST: 1995/8/20 8:32:54, PREVIOUS: 1998/8/27 8:32:20, NUMBER OF TIMES: 632, TIME ZONE: 4:00:00–9:00:14
   server2:
   ...

F I G. 5

ACCESS RESTRICTION INFORMATION 204

NAME OF USER : userA
ACCESS FILE SETTING :
    file1.txt : NUMBER OF TIMES: 3 OR LESS, TIME ZONE: OTHER THAN 9:00:00 – 18:00:00
    file2.txt : NUMBER OF TIMES: 3 OR LESS, TIME ZONE: OTHER THAN 10:00:00 – 18:00:00
    file3.txt : TIME ZONE: OTHER THAN 0:00:00 – 0:00:00
COMMAND EXECUTION SETTING
    exec.exe : NUMBER OF TIMES: 3 OR LESS, TIME ZONE: OTHER THAN 9:00:00 – 18:00:00
    cmd.exe : NUMBER OF TIMES: –1 OR LESS, TIME ZONE: OTHER THAN 0:00:00 – 0:00:00

F I G. 7

ACCESS RESTRICTION INFORMATION 205
(FOR A NEW USER)

NAME OF USER : new
ACCESS FILE SETTING :
    file1.txt : NUMBER OF TIMES: 0 OR LESS, TIME ZONE: OTHER THAN 9:00:00 – 18:00:00
    file2.txt : NUMBER OF TIMES: 0 OR LESS, TIME ZONE: OTHER THAN 9:00:00 – 18:00:00
    file3.txt : TIME ZONE: OTHER THAN 0:00:00 – 0:00:00
COMMAND EXECUTION SETTING
    exec.exe : NUMBER OF TIMES: 0 OR LESS, TIME ZONE: OTHER THAN 9:00:00 – 18:00:00
    cmd.exe : NUMBER OF TIMES: –1 OR LESS, TIME ZONE: OTHER THAN 0:00:00 – 0:00:00

F I G. 8

ACCESS LOG THROUGH NETWORK  206

NAME OF COMPUTER REQUESTING TO BE CONNECTED : mailserver1
MAIL ADDRESS : userA
SENDER OF MAIL : senderX
NAME OF COMPUTER WHICH IS PASSED THROUGH : mailserv2, mailserv3
DATE AND TIME OF RECEPTION OF MAIL : 1998/3/20 14:22:36
USED PROTOCOL : smtp

F I G. 9

SECURITY MANAGEMENT INFORMATION 207

NAME OF COMPUTER REQUESTING TO BE CONNECTED : mailserver1, mailserv2, ...
MAIL ADDRESS : userA, userB, ...
SENDER OF MAIL : senderX, senderY, senderZ, ...
NAME OF COMPUTER WHICH IS PASSED THROUGH : mailserv2, mailserv3
DATE AND TIME OF RECEPTION OF MAIL : 1998/3/20 14:22:36
USED PROTOCOL : smtp, ...

F I G. 10

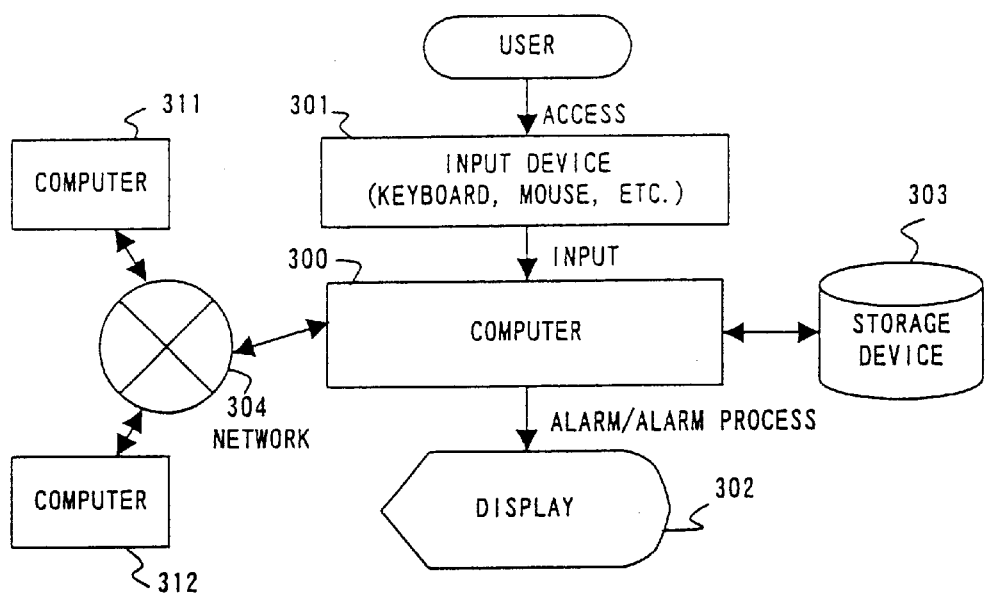
F I G. 12

EXAMPLE OF ALARM PROCESS SETTING

| | |
|---|---|
| (1) | ISSUES AN ALARM, PROHIBITS AN ACCESS, AND LOCKS OUT THE USER. |
| (2) | ISSUES AN ALARM AND PROHIBITS AN ACCESS. |
| (3) | ISSUES AN ALARM AND PROHIBITS AN ACCESS UNTIL A MANAGER ALLOWS IT. A USER WAITS UNTIL THEN. |
| (4) | ISSUES AN ALARM, REQUEST A USER TO ENTER THE SECOND PASSWORD. ONLY WHEN IT IS JUDGED TO BE LEGAL, IS ACCESS ALLOWED. |
| (5) | ONLY ISSUES AN ALARM AND ACCESS IS PERMITTED. |
| (6) | ACCESS IS PERMITTED AS USUAL. |

FIG. 14

EXAMPLE OF ALARM FOR A USER

| (1) | ACCESS IS PROHIBITED. YOUR USER ID IS LOCKED OUT. IF YOU WANT TO GAIN ACCESS, PLEASE CONTACT A MANAGER. |
|---|---|
| (2) | ACCESS IS PROHIBITED. |
| (3) | ACCESS IS RESTRICTED. PLEASE WAIT UNTIL A MANAGER ALLOWS ACCESS. |
| (4) | ACCESS IS RESTRICTED. PLEASE ENTER THE SECOND PASSWORD. |
| (5) | ALTHOUGH ACCESS IS ABNORMAL, ACCESS IS ALLOWED. |
| (6) | NO ALARM |

FIG. 15

EXAMPLE OF ALARM FOR A MANAGER

| (1) | THERE IS ACCESS WHICH IS PROHIBITED. A USER XXXXX IS LOCKED OUT. |
|---|---|
| (2) | THERE IS ACCESS WHICH IS PROHIBITED. THE USER: OOOOO |
| (3) | THERE IS ACCESS WHICH IS RESTRICTED. SHOULD ACCESS BE ALLOWED? |
| (4) | THERE IS ACCESS WHICH IS RESTRICTED. THE SECOND PASSWORD IS REQUESTED. |
| (5) | THERE IS ACCESS WHICH IS RESTRICTED. |
| (6) | NO ALARM |

F I G. 16

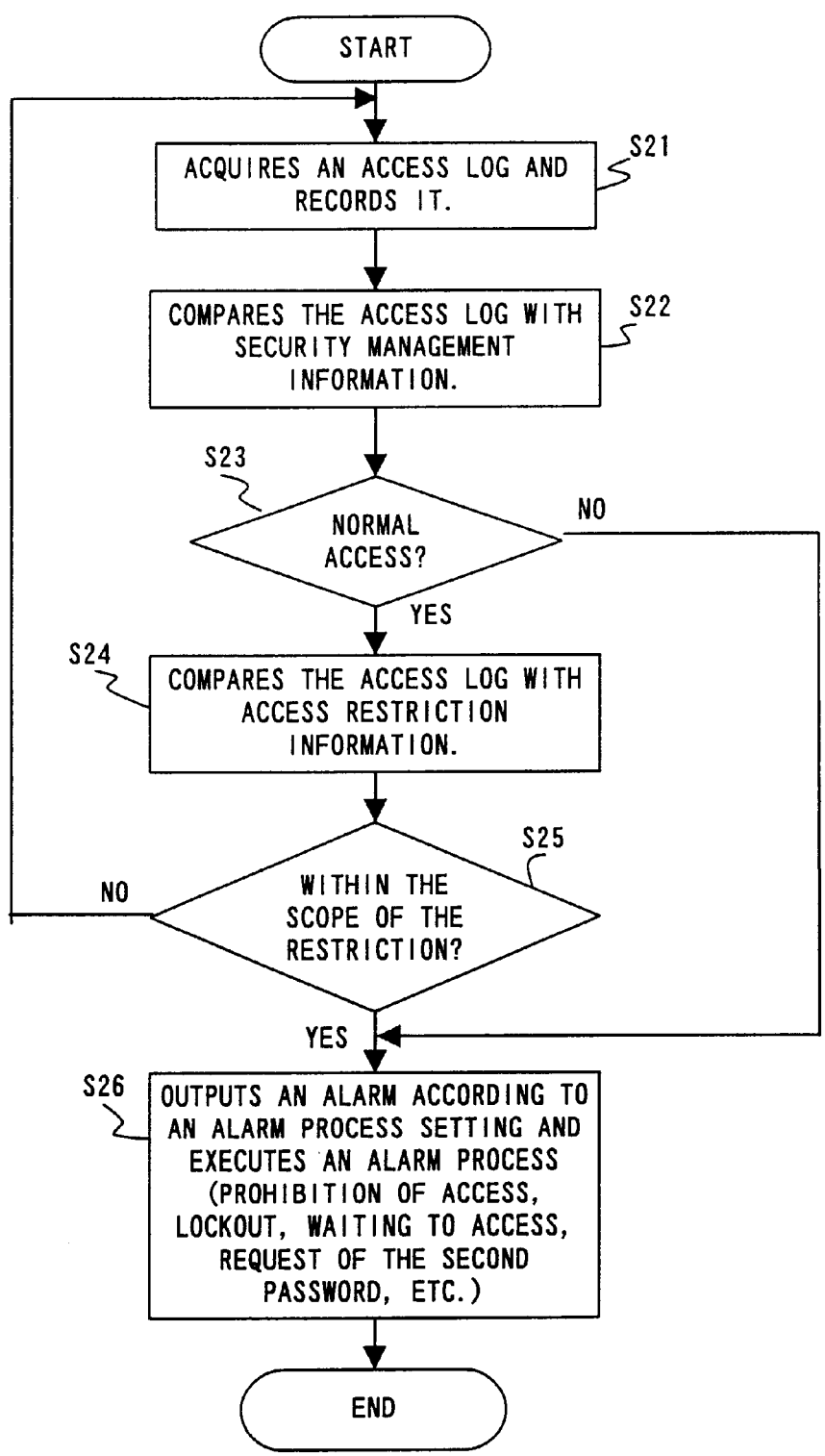
F I G. 17

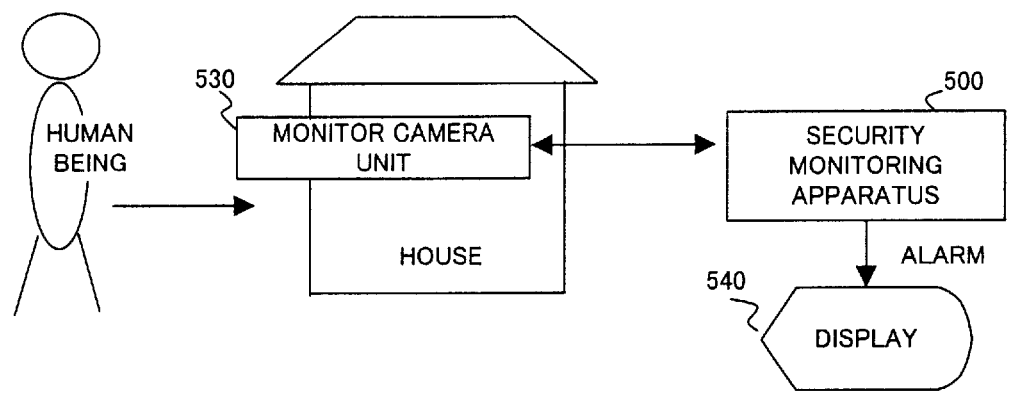
F I G. 19

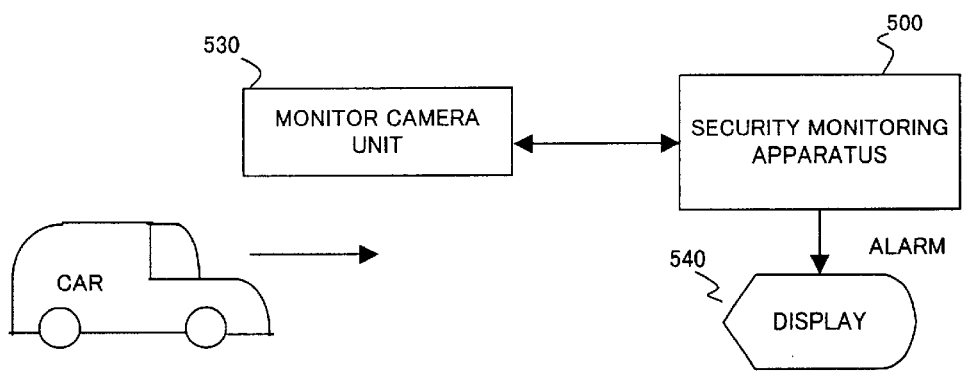
F I G. 20

SECURITY MONITORING APPARATUS BASED ON ACCESS LOG AND METHOD THEREOF

BACKGROUND OF THE INVENTION

1. Field of the Invention

The present invention relates to a technology for the security of electronic equipment, and in particular relates to the security monitoring apparatus, security monitoring method and program storage medium for the security of electronic equipment for realizing the maintenance and management of security of complicated electronic equipment without burdening on a user.

2. Description of the Related Art

Conventionally, in order to maintain and manage security for access management, etc., of electronic equipment, such as a computer, etc., security monitoring systems, such as a user management system using a user ID and a password, data leak prevention systems using cryptography, access control systems, authentication systems, etc., have been developed.

In such a security monitoring system, management information about a user, etc., which is set in advance (a user ID, a password, etc.) and management information which is required for the user to operate an apparatus are chiefly collated, and if they match as specified or they are judged as being within an allowed scope, the requirement of the user is executed. Namely, conventional security management is based on the authentication of a user.

However, in such a security management system based on authentication, such as a user ID, password, access restriction, etc., of a user, the management of an access log, such as one performing a check of the access log by a legal user or manager and a verification of whether the access has been made by the legal user, the manager or another legal user, etc., is always required in order to check whether there is an illegal access. Such a system has a fundamental weak point that, a simple user ID and password are easy to be acquired illegally. It also has a problem in that a user has to check the access log every time, which is very troublesome. Since the log management more or less relies on an operator, it takes time to verify the legality of an access, and as a result, it also takes time to detect the illegality of an access.

If some user authentication information leaks, it takes a great deal of labor and time to verify whether there is an illegal access, and discovery of the illegale access is greatly delayed, which is another problem.

For the above-described reasons, the conventional security management system based on the authentication of a user has no basic security control over the leakage of authentication information, or it takes a great deal of labor to maintain and manage security in the conventional security management system.

Since a semi-automatic access, which is an access made through a network and in which basically there is no user control, as in a mail reception protocol of a mail server, etc., is virtually automatically made with a certain kind of special execution priority usually by using a specific user name, sufficient attention has to be paid to security. However, an illegal user, virus, etc., often gains access by taking advantage of such a weak point in the security system, and the security monitoring based on the authentication of a user is basically powerless against such an access.

However, although a security system using cryptography has a merit in that major information cannot be decoded even when data are transmitted through a network or when a user gains illegal access to the data, it is powerless against an illegal log-in and an illegal access.

SUMMARY OF THE INVENTION

The object of the present invention is to provide a security monitoring system which does not maintain nor manage security based on the authentication of a user, but performs more powerful maintenance and management of security even if the authentication information of a user leaks, by monitoring the access situation from a user or through a network, detecting an abnormal access and issuing an alarm.

The present invention comprises a mechanism for monitoring access to electronic equipment to be monitored from the outside and issuing an alarm by referring to the access log (security management information) concerning past access situations if a new access is judged to be abnormal from the access log in the past.

According to the present invention an access situation at the time of access, such as an access environment, access time, etc., is acquired in electronic equipment with an access means from the outside, is accumulated there, and an alarm is issued to a manager or user if the access situation meets a predetermined criterion. The typical access method for electronic equipment includes, for example, an inputting means, such as a network, a keyboard, a mouse, etc. The typical type of accessing electronic equipment includes, for example, log-in to the equipment, file access, an execution command to operate the equipment, access through a network, etc.

A means for setting criteria for access situations according to a frequency of access and a type of access (write, read, execute, etc.) can also be provided.

For example, the mechanism can be configured in such a way that alarms are issued a certain number of times or for a certain time period after the first access and may not be issued if the same access is repeated a certain number of times, according to security management information which is obtained from an access log in the past.

Furthermore, a mechanism for setting how an access can be prohibited from being accepted or allowed to be accepted after issuing an alarm as a result of security monitoring if access is received from a certain user, can be added. Alternatively, in equipment with a security management mechanism using a password, a mechanism for allowing access to be accepted if another password is requested after an alarm is issued based on the security management information and the inputted password is judged to be legal when an access from a certain user is received, can be provided.

Alternatively, the time zones of security management information can be statistically processed by using a normal distribution, etc., of the access time of a user, and the scope for issuing an alarm can be determined using the variance of the access time as a base.

Alternatively, a mechanism for utilizing a plurality of setting files relating to security management information and access restriction information, modifying a setting file to be used according to the access situation of a user, such as elapsed time, the frequency of accesses, etc., and modifying and managing a security level, can be provided in order to manage the security level. Thus, for example, when a new user is registered, etc., a security check different from that for a legal user can be applied to the new user by utilizing an access situation which is initially set.

A program causing a computer to execute each of the above-described processes can be stored in an appropriate computer-readable storage medium, such as a portable medium memory, a semiconductor memory, a hard disk, etc.

BRIEF DESCRIPTION OF THE DRAWINGS

FIG. 1 explains the summary of the present invention.

FIG. 2 shows a configuration example of the first preferred embodiment of the present invention.

FIG. 3 shows an example of an access log.

FIG. 4 shows an example of security management information about a user.

FIG. 5 shows an example of security management information about a computer.

FIG. 7 shows an example of access restriction information.

FIG. 8 shows an example of access restriction information for a new user.

FIG. 9 shows an example of an access log which is acquired from an access through a network.

FIG. 10 shows an example of the security management information of an access log which is acquired from an access through a network.

FIG. 12 shows a configuration example of hardware for realizing the present invention in the first preferred embodiment.

FIG. 14 shows examples of an alarm process setting.

FIG. 15 shows examples of an alarm for a user which corresponds to each alarm process setting.

FIG. 16 shows examples of an alarm for a manager which corresponds to each alarm process setting.

FIG. 17 shows the summary of the process flow in the second preferred embodiment.

FIG. 19 shows a case example in which a security monitoring apparatus is used as a house-breaking monitoring apparatus.

FIG. 20 shows a case example in which a security monitoring apparatus is used as a traffic monitoring apparatus.

DESCRIPTION OF THE PREFERRED EMBODIMENTS

Figure 6:
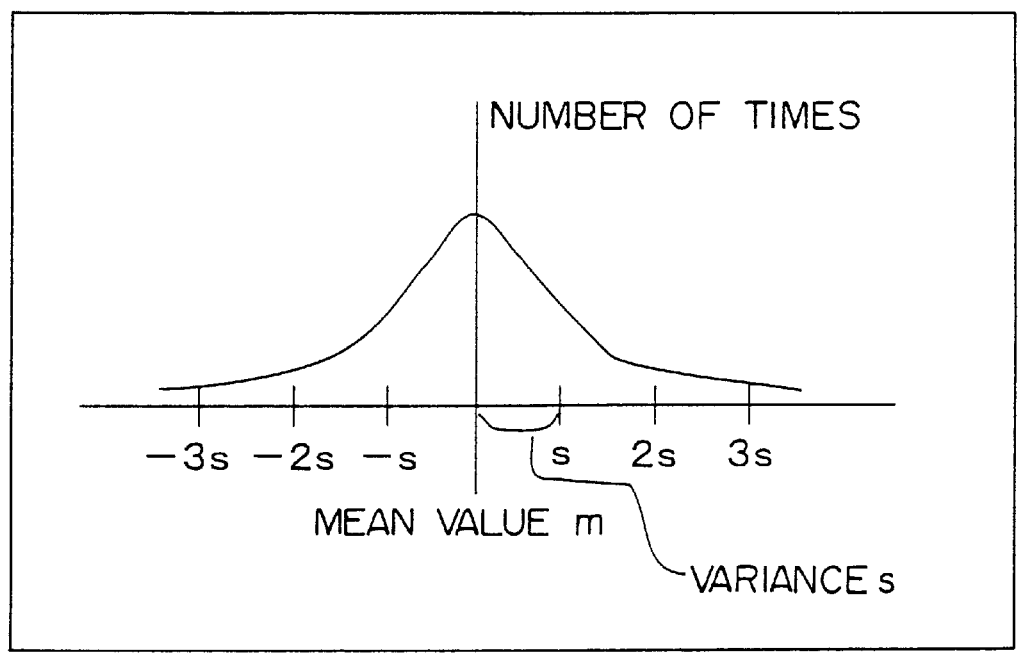
FIG. 6 shows an example of the distribution of the access time of a certain user.

FIG. 1 explains the summary of the present invention.

A security monitoring apparatus 1 of the present invention is used together with electronic equipment 2, and comprises an access monitor unit 10 for continually monitoring access situations, such as the access environment, access time, etc., at the time of an access, and an abnormality alarm unit 20 for issuing an alarm and reporting to a manager or a specific user that some abnormal access occurs when there is an access made that is different from a normal access. It further comprises an alarm process unit 30 for executing a predetermined alarm process for temporarily prohibiting user access, etc., which is set by an alarm process setting unit 31, following the issuance of an alarm by the abnormality alarm unit 20. Although in FIG. 1, the electronic equipment 2 and the security monitoring apparatus 1 are shown separately, the security monitor apparatus 1 can also be incorporated into the electronic equipment 2.

Specifically, when access is received by the electronic equipment 2, the access monitor unit 10 acquires an access log using an access log acquisition unit 11, executes the statistical process of the access log using a security management unit 12, and stores the obtained result as security management information. The access monitor unit 10 detects a difference between this access situation and a past access situation by comparing the access log acquired by the access log acquisition unit 11 with security management information obtained from the access log in the past using a security check unit 14, and judges that an access gained in a situation different from a normal one is an abnormal access, and issues an alarm to the manager or specific user using the abnormality alarm unit 20.

Alternatively, access restriction which is set in advance using an access restriction setting unit 13 can be taken into consideration when the access log and the security management information are compared using the security check unit 14. If the access log of this time violates the set access restriction, the access monitoring apparatus issues an alarm to the manager or specific user using the abnormality alarm unit 20. Furthermore, the alarm process unit 30 executes alarm processes, such as locking out the user ID, prohibiting the user from accessing, requesting a second password, etc., based on a setting by an alarm process setting unit 31.

Therefore, even if information for user authentication leaks and a user illegally accesses in a way or an environment different from that of a legal user, access can be judged to have been gained in a situation different from a normal access (abnormal) and an alarm can be issued. Furthermore, an alarm process which is set in advance can be immediately executed, and thereby more powerful security can be realized.

The preferred embodiments of the present invention are described in detail with reference to the drawings below. Fundamentally, there is no need for user authentication information in the present invention. However, in current electronic equipment, such a security management method is general, and in the present invention, more powerful security can be secured by utilizing user authentication information. Therefore, in the following description of the preferred embodiments of the present invention, a security monitoring apparatus in which a system of the present invention is added to the conventional security system based on user authentication is described.

[The First Preferred Embodiment]

First, the first preferred embodiment is described. Here, a case where access to electronic equipment, such as a computer, etc., is monitored is described.

FIG. 2 shows a configuration example of the first preferred embodiment of the present invention. An access monitor unit 110 in a security monitoring apparatus 100 monitors access to electronic equipment to be monitored, and when an access request is received from a user, it judges whether access request is normal. If access is judged to be normal, access monitoring is continued as usual. However, if it is judged to be abnormal, a report is made to an abnormality alarm unit 120 that access is abnormal, and the abnormality alarm unit 120 reports to a specific user or manager through an output device 140 that access is abnormal.

The access monitor unit 110 comprises an access log acquisition unit 111 for acquiring the access log 201 of access to electronic equipment, a security management unit 112 for executing the statistical process of the access log which is acquired by the access log acquisition unit 111 and managing the processing result as security management information 203, an access restriction setting unit 113 for setting access restriction information 204 which defines conditions for detecting abnormality, and a security check unit 114 for checking whether access is normal. The security check unit 114 includes a log comparison unit 115 for detecting an abnormal access by comparing the access log 201 with the security management information 203, and a restriction comparison unit 116 for judging whether access violates the set access restriction information 204.

The access log acquisition unit 111 acquires the access log 201. The access method for electronic equipment includes access from another electronic equipment through a network, and access to a computer from a variety of inputting means, such as a keyboard, mouse, etc., of which access logs are acquired by the access log acquisition unit 111.

FIG. 3 shows an example of an acquired access log 201 of access to a computer. For an access log 201, information, such as the name of a user, a password, the data and time of an access, the name of an accessed file, the name of an executed command, etc., are acquired and stored. The access log 201 is transmitted to the security management unit 112.

The security management unit 112 executes the statistical process of the access log 201 which is acquired by the access log acquisition unit 111, converts the access log to security management information 203, such as the frequency of access, the time zone of access date and time (the beginning time and the end time of a period in which access is gained, the day of the week on which access is gained, etc.), the name of a file accessed in the past, the frequency of access to the file, the time zone in which the file was accessed, the name of an executed command, the frequency of the execution of the command, the time zone in which the command was executed, etc., for each user, and stores obtained information. Alternatively, the access log 201 can be statistically processed for each file or computer, and can be stored as security management information 203.

FIG. 4 shows an example of security management information about a user, and FIG. 5 shows an example of security management information about a computer.

The security management information 203 about a user shown in FIG. 4 is stored for each user, and includes the password of the user, the number of times a specific computer was accessed, the date and time of the first access and previous access and the time zones, the date and time of the first access and previous access for each accessed file, the number of times each file was accessed, the time zone in which each file was accessed, the date and time of the first and previous executions for each command, the number of times each command was executed, the time zone in which each command was executed, the computers which gained access, etc.

The security management information 203 about a computer shown in FIG. 5 is stored for each computer, and includes the registered name of a user, the date and time of the first access and previous access for each accessed file, the number of times each file was accessed, the time zone in which each file was accessed, the date and time of the first and previous executions for each command, the number of times each command was executed, the time zone in which each command was executed, the date and time of the first access and previous access for each computer to be accessed or for each computer to gain access, the number of times each computer was accessed or each computer gained access, the time zone in which each computer was accessed or each computer gained access, etc.

Concerning the information about a time zone, of the security management information 203 shown in FIGS. 4 and 5, the time when a user access or another computer access is not determined exactly, as between the predetermined beginning and end times, and it often slides gradually by repeating an access.

For this reason, the security management unit 112 manages information about a time zone using a method for determining the scope of the time zone where access is gained with a statistical prosess. For example, if the distribution of the access time of a certain user is assumed to be a normal distribution as shown in FIG. 6, the distribution can be indicated by using both a mean value m and a variance s. Therefore, if a time zone from which a user access is judged to be normal is assumed to be a scope of plus/minus 3s, as in m±3s, an access of about 99.7% of time zones in which the user has accessed before can be permitted with no conditions. Such statistical information about an access is calculated for all accesses without dividing a section or by dividing a section of, for example, the past one month or one year, if necessary, and the time zone in which an access is permitted is set based on the calculation. If this method is adopted, the access time zone of a user automatically changes according to the use situation of the user, regardless of its initial setting, thus making it convenient.

A log comparison unit 115 compares the access log 201 of this time which is acquired by the access acquisition unit 111 with the access situation of security management information 203 which is acquired from log information acquired before. The comparison is performed for a part or all of the situations which are stored as security management information 203. The contents to be compared can be set in advance by a user or can be determined by a manager. Alternatively, modifications can be made according to the desired level of security.

It is assumed here that the date and time of an access, accessed file and executed command of a user A are managed for the purpose of security, and the information is compared with the acquired access log in order to judge whether this access is within the scope of the security management information 203. If access is within the scope, it is judged to be normal and the next process is executed by the restriction comparison unit 116.

For example, if a file which has never been accessed before is accessed, it is judged that access is out of the scope of the security management information 203 and an instruction to issue an alarm is issued to an abnormality alarm unit 120 when the accessed file is compared with the security management information 203. When an executed command is compared with the security management information 203, it is checked whether the command has ever been executed. If the command is not recorded in the security management information 203, an instruction to issue an alarm is issued to the abnormality alarm unit 120.

For example, if the access log 201 of the user A is as shown in FIG. 3 and the security management information 203 as shown in FIG. 4 is stored for the user A, the access time is 18:30:34 and within the scope of the access time zone 10:00:00–19:00:00 of the security management information 203 as a result of the log comparison. In this case, the access is judged to be normal and it is checked whether the access violates the access restriction.

However, if the access time of the user A is 21:00, it is out of the scope of the security management information 203, and an instruction to issue an alarm is issued from the log comparison unit 115 to the abnormality alarm unit 120.

The restriction comparison unit 116 compares the access log 201 of this time with the corresponding part of the access restriction information 204 which is set in advance by the access restriction setting unit 113. If as a result, the access log 201 is out of the scope of the restriction which is set in the access restriction information 204, the restriction comparison unit 116 judges that the access can be accepted, it waits for the next access and no alarm is issued. However, if the access log 201 is within the scope of the access restriction information 204, the restriction comparison unit 116 judges that it violates the access restriction, and issues an alarm instruction indicating that the access violates the access restriction.

The access restriction setting unit 113 sets access restriction information 204 for each file and execution command, which are used in the restriction comparison unit 116. FIG. 7 shows an example of set access restriction information.

The access restriction information 204 includes information relating to the number of times of access and the scope of the access time where an access to a file or an execution of a command is restricted. For example, a scope such as "the number of times of access is three or less", "the access time zone is a zone other than 9:00:00–118:00:00", etc. is set as an access file setting for a specific file for each user. And a scope such as "the number of times of executions is −1 or less", "the execution time zone is a zone other than 0:00:00–0:00:00", etc. is set as a command execution setting for a specific command. Here, the number of times "−1" is used to indicate the infinity.

The access management of a user can be performed by setting for each user whether each file can be accessed in the access file setting of the access restriction information 204. For example, when access from a general user to a manager's file which can be accessed only by the manager, is to be restricted, the information can be set in such a way that access to the manager's file is always prohibited if the access restriction time to the manager's file is set to the entire time zone (24 hours) such as a zone other than 0:00:00—0:00:00.

In the same way, access restriction information 204 can be used, for example, when a general user is prohibited from executing commands for the system management of a computer. If access to such commands, of which number of times is less than or equal to infinity, is set not to be accepted in the access restriction information 204, the execution of the commands for management by a general user can be always restricted.

Although in UNIX operating systems, etc., access management is performed by modifying a file attribute, in this system, the more detailed monitoring of file access can be performed based on situations, such as when a file is accessed, from which location a file is accessd, which user accesses a file, whether access is normal or abnormal, etc.

The abnormality alarm unit 120 includes an abnormality alarm receiving unit 121 for receiving from the access monitor unit 110 a report that access is abnormal, and an alarm issuance unit 122 for determining what class of alarm to issue when receiving the abnormality alarm and actually issuing When receiving from the access monitor unit 110 a report that an abnormality has occurred, the abnormality alarm receiving unit 121 checks the contents of the abnormality and determines to whom to issue an alarm. The alarm issuance unit 122 issues an alarm through the output device 140. The abnormality alarm unit 120 can be configured in such a way that the alarm is stored in a specific file as log information, mailed to a system manager, or displayed on a screen of a display device.

For example, it is assumed that access as shown in the access log 201 of FIG. 3 is received in a situation where security management information 203 as shown in FIG. 4 is stored for a user A. It is also assumed that for access restriction information 204 for the user A, access restriction as shown in FIG. 7 is set. Since the number of times of access to the file "file1.txt" by the user A is "22" in the security management information 203, the number of times of the access in the access log 201 is out of the scope of "3 or less" in the access restriction information 204. However, since its access time is "18:30:34" in the access log 201, it is within the scope of "a zone other than 9:00:00–18:00:00" in the access restriction information 204. Accordingly, an alarm signifying that access is abnormal is issued. Since the number of times of executions of the command "exec.exc" is "62" in the security management information 203, the number of times of executions in the access log 201 is out of the scope of "3 or less" in the access restriction information 204. However, since its execution time is "18:32:20" in the access log 201, it is within the scope of "a zone other than 9:00:00–18:00:00". Accordingly, and in the same way, an alarm is issued.

A concrete example of the alarm is given below. If the access time of the user A is "21:00:00", it differs from the normal access time of the user A. Therefore, when the abnormality alarm unit 120 receives the report from the access monitor unit 110, the following alarm is issued from the alarm issuance unit 122, basically, to a manager.

"Alarm: A user A has abnormally logged in at 21:00:00."

If the user A has accessed a file which has never been accessed before, the following alarm is issued.

"Alarm: The user A has accessed a file F which has never been accessed before."

In a system where user authentication is performed using both a user ID and a password, it is possible that such a situation can occur when the authentication information, such as the user ID, password, etc., of the user A is stolen. For example, if access is received at a time zone other than 10:00:00 to 19:00:00, which is the normal access time zone of the user A, there is a possibility that another user has gained access using both the user ID and password of the user A. In this case, an alarm that an access is received in an abnormal time zone is issued.

In a situation where computers are connected through a network, a certain computer often logs into another computer, and vice versa. In this case, if information about from which computer each user usually accesses, is acquired in advance for each user, an alarm indicating that a certain user has gained access from a computer other than the usual computer can be issued when it is judged that access is made from the computer other than the usual computer, since there is a possibility that the access is illegally gained by another user. Therefore, according to this system, even when both the user ID and password of a user are stolen, an alarm that abnormal access is received can be issued if an access situation in which a legal user does not gain access is detected. Accordingly, more powerful security can be guaranteed.

In order to simplify the description of the security check unit 114 shown in FIG. 2, it has been described that the detection of abnormal access by the log comparison unit 115 and the detection of abnormal access based on the access restriction information 204 by the restriction comparison unit 116 are independently performed in the security check unit 114. However, the security check unit 114 is also configured in such a way that the detection of abnormal access by the security check unit 114 is performed in a form where both detection by the log comparison unit 115 and detection by the restriction comparison unit 116 are related. For example, the security check unit 114 can be configured so as to issue an alarm according to the setting of a predetermined setting file only when both the log comparison unit 115 and the restriction comparison unit 116 detect an abnormality. Alternatively, the security check unit 114 can comprises only the log comparison unit 115 or the restriction comparison unit 116. Alternatively, the security check unit 114 can be configured so as to determine comparison conditions for the log comparison unit 115 based on access restriction information 204 or other setting information.

In the above-described system, since there is no access history accumulated in security management information 203 about a user who has never gained access, an alarm is always issued to such a user. Thus, an alarm is issued for each access a new user makes, which is annoying from the viewpoint of management. For this reason, separate access restriction information for a new user, which specifies access to files and its access time zone considered to be usual, is prepared as an initial setting in order that even a new user can gain access without an alarm being issued. Then, such a annoying situation can be avoided.

Alternatively, separate access restriction information is set in such a way that an alarm is issued in the first attempt and not issued when the number of times of access exceeds a specified number. In this case, if access is repeated several times, the number of times of access increases, and therefore, an access made after the predetermined number of times of access is regarded as normal and an alarm is not issued for the access even when a legal user gain access in the normal way.

FIG. 8 shows an example of access restriction information on a new user.

Access restriction information for new users 205 is applied to new users and users at a specific security level. The security level of a user to whom the access restriction information for new users 205 is applied is modified to the security level for ordinary users after a predetermined period of time has elapsed or after the number of times of access reaches a predetermined number, such as after a week or after three times of access, respectively. In this way, after that limit has been reached, access restriction information for ordinary users 204, as shown in FIG. 7, is applied instead of access restriction information for new users 205 as shown in FIG. 8.

Although a case where different access restriction information is used according to the security level of a user, that is, either a security level for new users or a security level for ordinary users are used, is described above, in the same way, a security level can be finely classified and access monitoring can be realized according to its security level by preparing a variety of access restriction information corresponding to a variety of security levels.

Access to electronic equipment includes not only access from a user, but also semi-automatic access from other equipment in a network. For example, it includes access from a mail server. Since mail can activate a certain kind of program in a mail server or a computer which receives the mail, it is difficult to guarantee the security of the electronic equipment. In this system, security monitoring can also be performed for access between computers like this, in which users do not interfere.

FIG. 9 shows an example of an access log which is acquired from access through a network by a mail server. The security management unit 112 converts an access log 206 shown in FIG. 9 to security management information 207 shown in FIG. 10, and stores the security management information 207.

In this case, a log comparison process is executed, for example, as follows. The log comparison unit 115 compares the access log 206 shown in FIG. 9 with the security management information 207 shown in FIG. 10. If the access of the access log 206 is mail from an existing sender who is recorded in the security management information 207, the mail is received without an alarm being issued. However, if the access is mail from a sender who is not recorded in the security management information 207, the log comparison unit 115 reports to the abnormality alarm unit 120 that access is abnormal, and the abnormality alarm unit 120 issues, for example, the following alarm.

"Alarm: Mail has been received from an unknown user."

If such an alarm has been issued to a manager or addressed user, the manager or addressed user can arbitrarily handle the mail by deleting the mail without reading it, or by reading mail in a computer in which a virus will not cause a problem. Accordingly, appropriate security maintenance and management can be realized.

Figure 11:
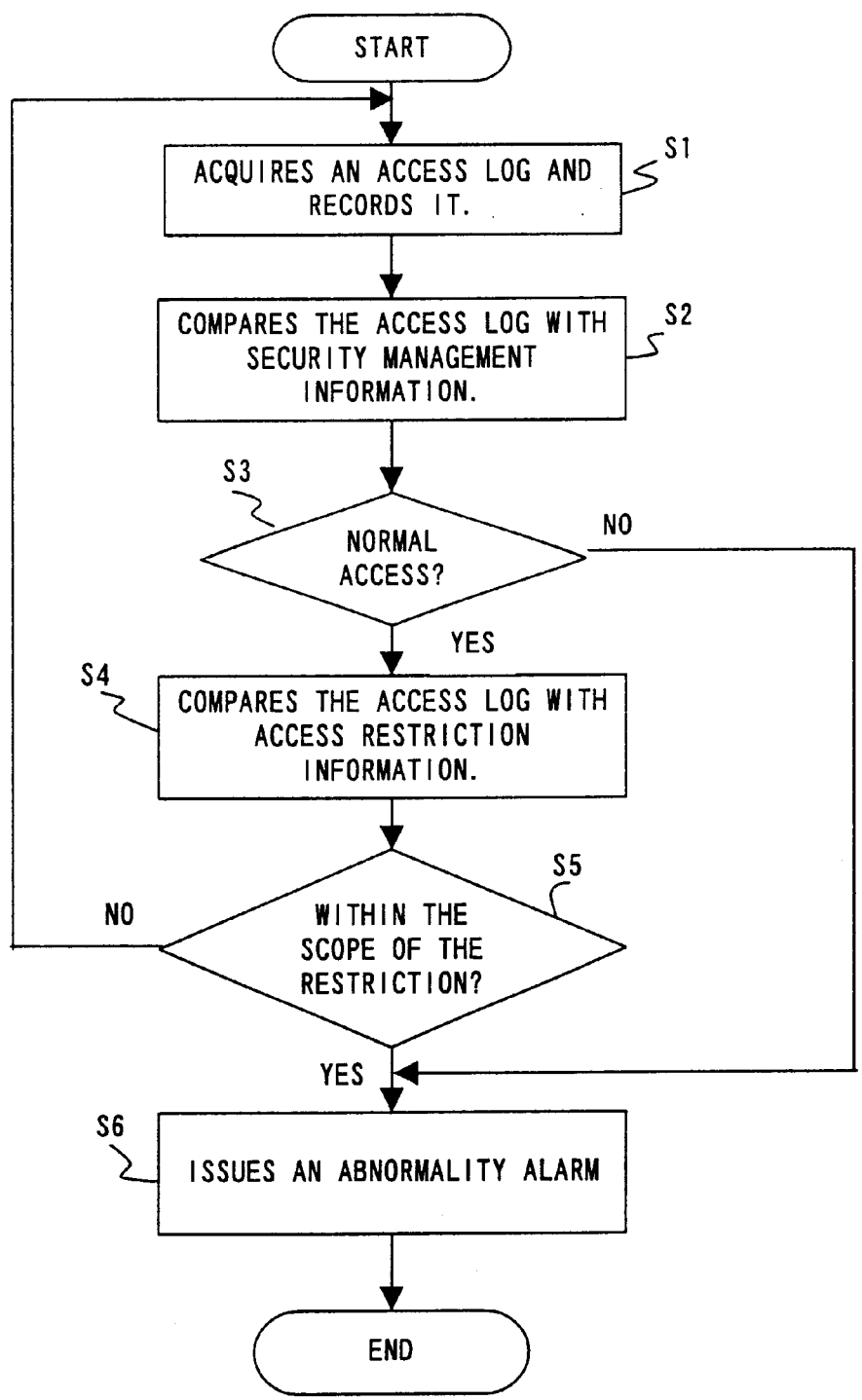
FIG. 11 shows the summary of the process flow of the first preferred embodiment.

FIG. 11 shows the summary of the process flow of the first preferred embodiment.

An access log 201 is acquired by the access log acquisition unit 111, is converted to security management information 203, and is recorded in the security management unit 112 (step S1). Then, the access log 201 and the security management information 203 are compared (step S2), and whether access is normal is judged based on whether the contents of the access log 201 is within the scope of the security management information 203 (step S3). If access is abnormal, the flow proceeds to step S6, and an abnormality alarm is issued by the abnormality alarm unit 120. If access is normal, the access log 201 and the access restriction information 204 are further compared by the restriction comparison unit 116 (step S4), and it is judged whether the access log 201 is within the scope of the access restriction (step S5). If the access log 201 is within the scope of the access restriction based on the access restriction information 204, an abnormality alarm is issued by the abnormality alarm unit 120 (step S6). If the access log 201 is out of the scope of the access restriction, the next access is waited for without an abnormality alarm being issued.

FIG. 12 shows a configuration example of the most typical hardware for realizing the first preferred embodiment of the present invention. In this example, a computer 300 serves both as electronic equipment to be monitored and the security monitoring apparatus 100. The computer 300 monitors both access from a network 304 and access to the main body of the computer 300 from an input device 301, such as a keyboard, mouse, etc., and an alarm is displayed on a display 302. The access log and security management information are stored in a storage device 303, such as a hard disk, etc., and are read since a comparison is required. Every time access is made, the security management information is updated, and is stored in the storage device 303.

[The Second Preferred Embodiment]

In this system, although an alarm is issued if it is judged that access is abnormal, access should be permitted if it can be verified that access is being attempted from a legal user. From the viewpoint of system operation, it is desirable to be able to determine whether access is permitted or prohibited after an alarm is issued. For this reason, in the second preferred embodiment, the system is configured in such a way that several procedures of an alarm process can be prepared and one of them can be selected.

Figure 13:
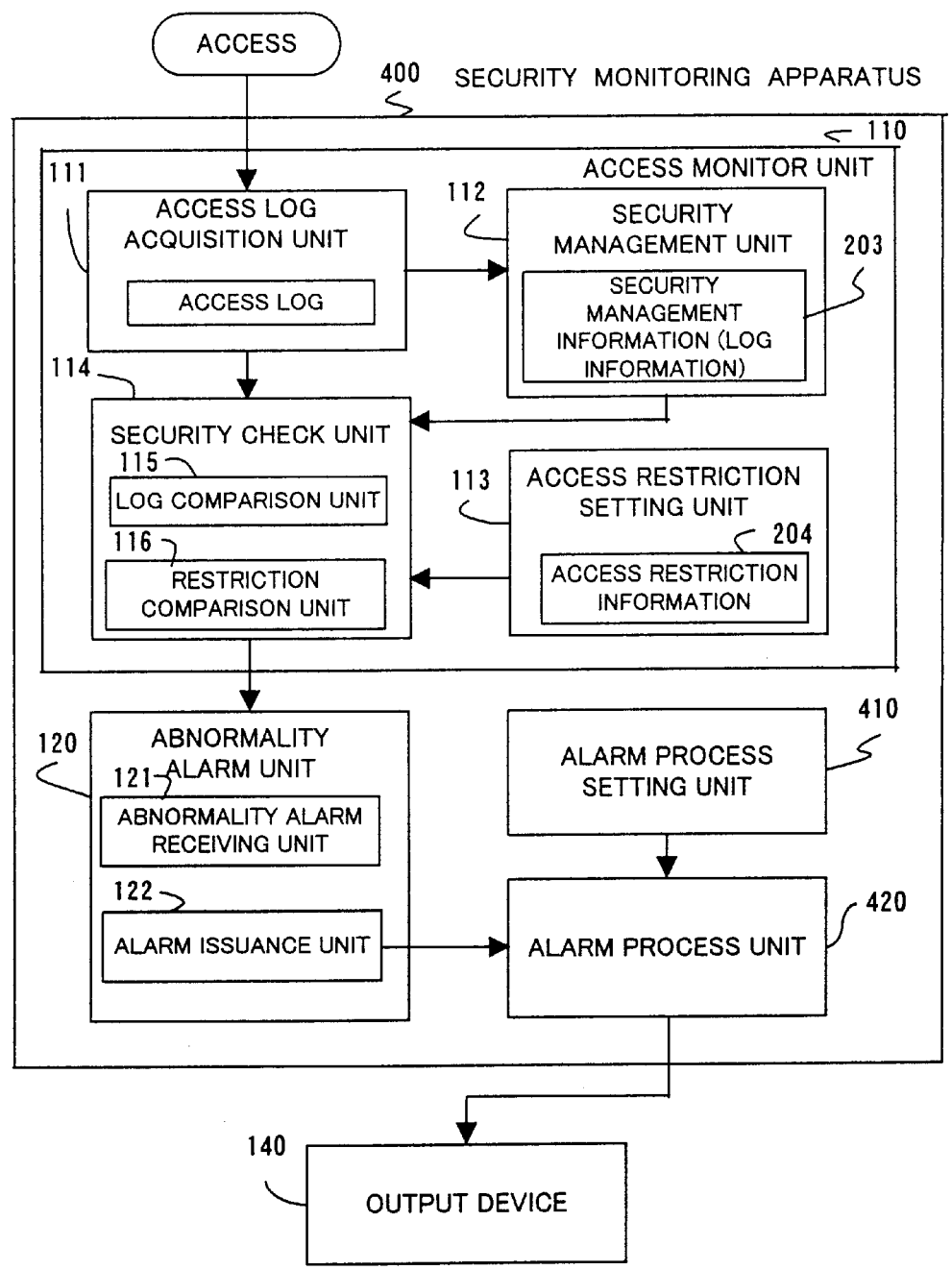
FIG. 13 shows a configuration example of the second preferred embodiment of the present invention.

FIG. 13 shows a configuration example of the second preferred embodiment of the present invention. A security monitoring apparatus 400 shown in FIG. 13 comprises the same component units as those of the security monitoring apparatus 100 shown in FIG. 2, and further comprises an alarm process setting unit 410 and an alarm process unit 420. Each of the component units, other than both the alarm process setting unit 410 and the alarm process unit 420 shown in FIG. 13, corresponds to the component unit of the same reference number shown in FIG. 2. However, the alarm issuance unit 122 in the abnormality alarm unit 120 issues an alarm to the alarm process unit 420 instead of outputting an alarm to the output device 140.

The alarm process setting unit 410 sets an alarm process which is executed after an alarm is issued, and the alarm process unit 420 executes the alarm process according to information which the alarm process setting unit 410 sets when receiving the alarm from the abnormality alarm unit 120.

FIG. 14 shows an example of an alarm process setting which is set in advance by the alarm process setting unit 410. FIG. 15 shows an example of an alarm for a user who corresponds to each alarm process setting. FIG. 16 shows an example of an alarm for a manager who corresponds to each alarm process setting.

If an alarm process setting (1) shown in FIG. 14 is performed, user access is prohibited after an alarm is issued by the alarm process unit 420, and the user is locked out. At this time, a message (1) shown in FIG. 15, "Access is prohibited. Your user ID is locked out. If you want to gain access, please contact a manager." is outputted to the user. To the manager, a message (1) shown in FIG. 16, "There is access which is prohibited. A user xxxxx is locked out." is outputted.

If alarm process setting (2) shown in FIG. 14 is performed, user access is prohibited after an alarm is issued by the alarm process unit 420. At this time, a message (2) shown in FIG. 15 is outputted to the user, and a message (2) shown in FIG. 16 is outputted to the manager.

If the alarm process setting (3) shown in FIG. 14 is performed, user access is prohibited until the manager allows user access after an alarm is issued by the alarm process unit 420. The user waits for it. At this time, a message (3) shown in FIG. 15 is outputted to the user, and a message (3) shown in FIG. 16 is outputted to the manager.

If an alarm process setting (4) shown in FIG. 14 is performed, the user is requested to enter the second password after an alarm is issued by the alarm process unit 420. Only when the second password is legal, access is allowed. At this time, a message (4) shown in FIG. 15 is outputted to the user, and the message (4) shown in FIG. 16 is outputted to the manager.

If an alarm process setting (5) shown in FIG. 14 is performed, access is permitted, although an alarm is issued by the alarm process unit 420. At this time, the message (5) shown in FIG. 15 is outputted to the user, and the message (5) shown in FIG. 16 is outputted to the manager.

If the alarm process setting (6) shown in FIG. 14 is performed, an alarm is not issued and access continues to be permitted as usual. This is the same situation as "without security", and no alarm message is outputted to both the user and the manager.

The system can also be configured in such a way that, out of the two messages set corresponding to each of the above-described alarm process settings, the message to a manager is outputted and no message is outputted to a user. Alternatively, it can be configured in such a way that no message is outputted to both a user and manager.

FIG. 17 shows the summary of the process flow in the second preferred embodiment.

An access log 201 is acquired by the access log acquisition unit 111, is converted to security management information 203 and is stored in the security management unit 112 (step S21). Then, the access log 201 and the security management information 203 are compared by the log comparison unit 115 (step S22), and whether access is normal is judged from whether the contents of the access log 201 is within the scope of the security management information 203 (step S23). If access is abnormal, the flow proceeds to step S26, and the alarm process of access by the alarm process unit 420 is performed through the abnormality alarm unit 120. If it is normal, the access log 201 and the access restriction information 204 are further compared by the restriction comparison unit 116 (step S24), and it is judged whether access log 201 is within the scope of the access restriction (step S25). If the access log 201 is within the scope of the access restriction based on the access restriction information 204, the flow proceeds to step S26. If it is out of the scope of the access restriction, the next access is waited for and no alarm process is executed.

In step S26, the messages shown in FIGS. 15 and 16 are outputted according to an alarm process setting which is set in advance by the alarm process setting unit 410, and the alarm process shown in FIG. 14 is executed.

[The Third Preferred Embodiment]

Although in the first and second preferred embodiments, an example of access to a computer is described, this system can be basically applied to all equipment which requires any monitoring, such as the monitoring of home security, the monitoring of prank calls, traffic monitoring, parking monitoring, etc.

Figure 18:
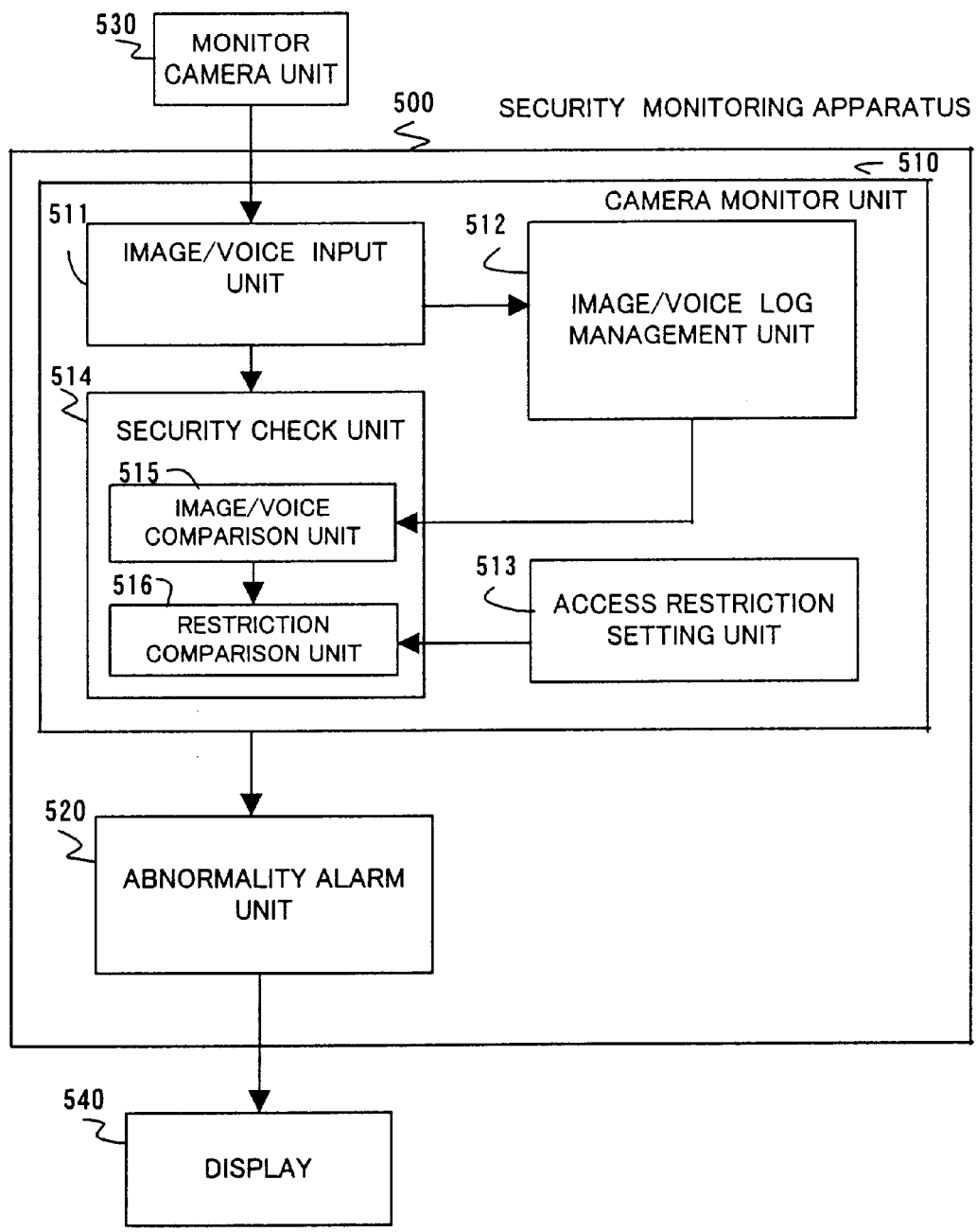
FIG. 18 shows a configuration example of the third preferred embodiment of the present invention.

FIG. 18 shows a configuration example of the third preferred embodiment of the present invention. A security monitoring apparatus 500 comprises a camera monitor unit 510, an abnormality alarm unit 520, a monitor camera unit 530 and a display 540.

The monitor camera unit 530 corresponds to the inputting means of a computer described in the previous preferred embodiments. The camera monitor unit 510, abnormality alarm unit 520 and display 540 correspond to the access monitor unit 10, abnormality alarm unit 20 and output device 40, respectively.

FIG. 19 shows an example in which the security monitoring apparatus shown in FIG. 18 is used as a home security monitoring apparatus. For home security monitoring, information, such as the hours at which family members return home, the number of family members, the photograph images of the faces of family members, if possible, etc., are obtained in advance, and when a person other than a family member visits home, etc., an alarm is issued.

Specifically, the visit time, the number of visitors, image information such as the photographs of the faces of visitors, if possible, etc., are obtained by a image/voice input unit 511 through the monitor camera unit 530, its feature information is extracted, and it is stored in a image/voice log management unit 512. Then, the information is compared with information about visitors, etc., that have entered before, which are stored in a image/voice management unit 512, by a image/voice comparison unit 515. If it is judged that the visit is abnormal, an alarm message is displayed on the display 540 or an alarm is issued using a buzzer, etc., by the abnormality alarm unit 520. Furthermore, it can also be checked by a restriction comparison unit 516 whether the visit is made by one of the prohibited visitors or in the prohibted visiting hours, based on preset access restriction information, and an alarm can be issued. Although an example in which an image is inputted is described, voice information which are inputted from a microphone can also be used for this security check.

FIG. 20 shows an example in which the security monitoring apparatus shown in FIG. 18 is used as a traffic monitoring apparatus. In traffic monitoring, for example, information about a car which passes through a certain point, such as an intersection, etc., such as the license number, model, driver, etc., of the car, is obtained, and when a car other than specified cars passes through the point, an alarm is issued.

Specifically, information about a car passing through a certain point, such as the license number, model, driver, etc., of the car is acquired by a image/voice input unit 511 through the monitor camera unit 530, and stored in the image/voice log management unit 512. Then, the information is compared with information about cars, etc., that have passed through before, which is stored in the image/voice log management unit 512, by the image/voice comparison unit 515. If the car is judged to be abnormal, an alarm message is displayed on the display 540 or an alarm is issued using a buzzer, etc., by the abnormality alarm unit 520. Furthermore, it can also be checked by a restriction comparison unit 516 whether the car or driver is one of the prohibited cars or drivers, based on preset access restriction information, and an alarm can be issued.

Figure 21:
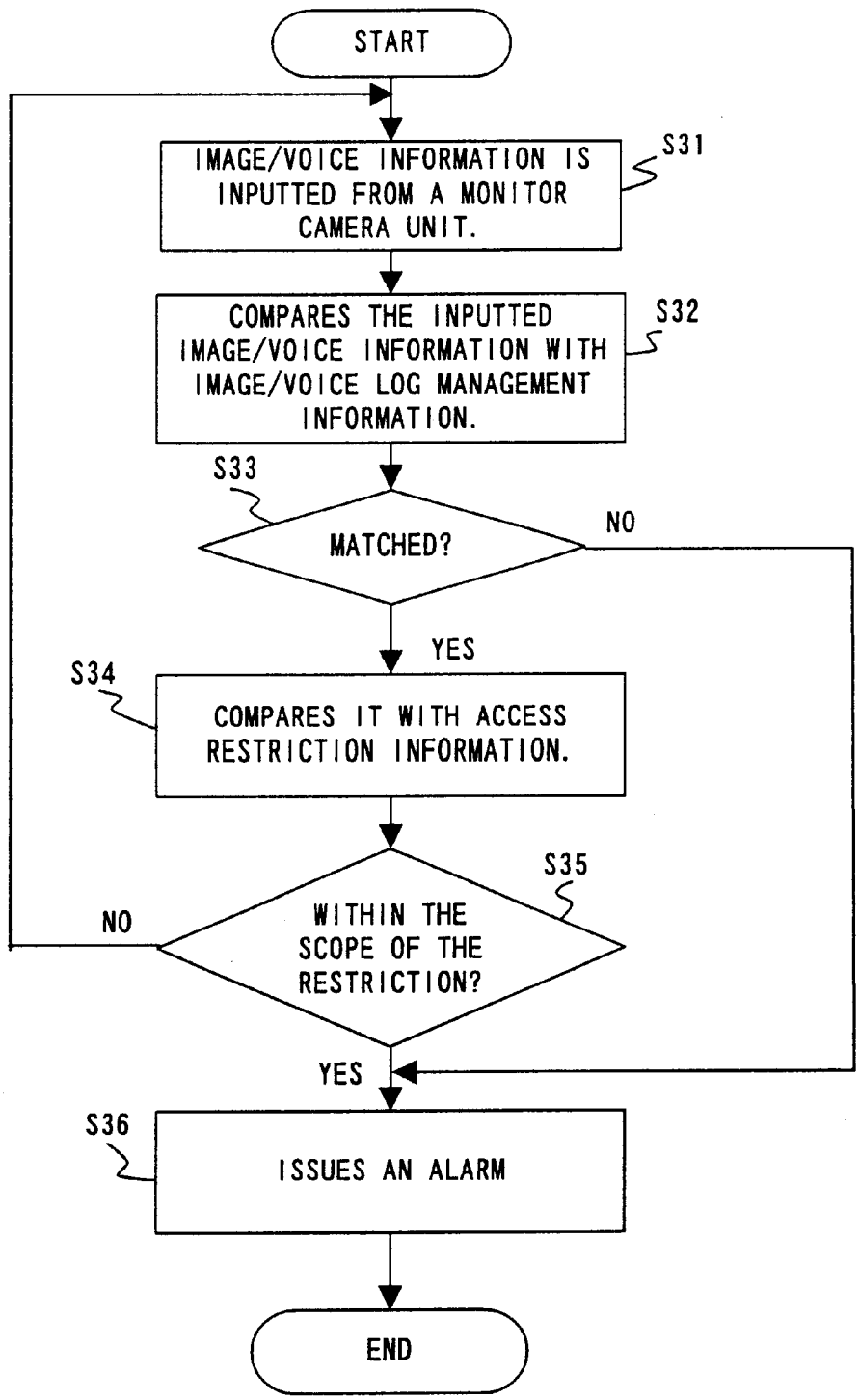
FIG. 21 shows the summary of the process flow of the third preferred embodiment.

FIG. 21 shows the summary of the process flow of the third preferred embodiment.

Image/voice information is inputted from the monitor camera unit 530, and is stored in the image/voice log management unit 512 (step S31). The image/voice comparison unit 515 compares the inputted image/voice information with the image/voice log management information which is stored in the image/voice log management unit 512 (step S32). The image/voice comparison unit 515 judges whether there is any information matching the inputted image/voice information among the image/voice log management information (step S33), and if there is no matched information in the image/voice log management information, an alarm is issued by the abnormality alarm unit 520 (step S36). If there is some matched information in the image/voice log management information, the information is further compared with access restriction information by the restriction comparison unit 516 (step S34), and it is judged whether the image/voice information is within the scope of the access restriction information (step S35). If the image/voice information is within the scope of the access restriction information, an alarm is issued by the abnormality alarm unit 520 (step S36).

As described above, according to this system the following operations are realized.

1) Security management information can be stored according to the type of access;
2) Arbitrary criteria which are used in a log comparison process can be set according to the frequency of access and the type of access (write, read, execute, etc.);
3) Prohibition against access can be set by setting the access designation period of access restriction information to infinite;
4) In order to manage a security level, a plurality of security management information files can be prepared, the security management information file which is used is changed according to the access time passage, such as elapsed time, the frequency of access, etc., of a user, and the security level can be modified and managed; and
5) After an alarm is issued, an alarm process regarding how access can be permitted, etc., can be set.

Accordingly, more powerful and appropriate security management can be realized. The present invention can also be applied to monitoring of illegal use of a credit card and access monitoring of the automatic teller machine of financial institutions.

As described above, according to the present invention, the situation of access from a user or through a network can be monitored regardless of the security maintenance and management system which is based on user authentication. Even if the authentication information of a user leaks, illegal accesses can be detected by checking whether access is abnormal, that is, different from a normal situation. Accordingly, powerful maintenance and management of security can be realized.

What is claimed is:

1. A security monitoring apparatus for monitoring access to electronic equipment from outside, comprising:
   an access log acquiring unit to acquire an access log concerning an access situation at a time of access;
   a security managing unit to accumulate acquired access logs, to calculate a statistical distribution of a plurality of access times in accumulated access logs, to determine a scope of a time zone of a normal access using a mean value and a variance of the statistical distribution, and to store the scope of the time zone as security management information; and
   a security checking unit to check whether a current access is different from the normal access, by comparing an access time of an access log of current access with the scope of the time zone of the security management information, and to determine that the current access is different from normal access if the access time of the current access is not included in the scope of the time zone.

2. The security monitoring apparatus according to claim 1, further comprising an abnormality alarming unit to issue an alarm if the current access is different from the normal access.

3. The security monitoring apparatus according to claim 1,
   further comprising an access restriction setting unit to set an access restriction which defines a condition for at least one access situation to be judged to be abnormal, and
   wherein said security checking unit judges whether the current access is different from the normal access, based on the access restriction which is set by said access restriction setting unit.

4. The security monitoring apparatus according to claim 3,
   wherein said access restriction setting unit stores a plurality of pieces of setting information corresponding to a plurality of security levels, and
   wherein said security checking unit selectively uses setting information according to a security level which is changed according to the access situation.

5. The security monitoring apparatus according to claim 1, further comprising an alarm processing unit to request a user to input password information if said security checking unit judges that the current access is different from the normal access, and to permit access if inputted password information is judged to be correct.

6. The security monitoring apparatus according to claim 1, further comprising:

an alarm process setting unit to set how to process the current access when said security checking unit judges that the current access is different from the normal access; and an alarm processing unit to perform an alarm process based on setting information which is set by the alarm process setting unit.

7. The security monitoring apparatus according to claim 1, wherein said security managing unit determines the scope of the time zone for each of a plurality of files in the electronic equipment; and wherein said security checking unit checks the current access to one of the files using a corresponding scope of a time zone for the one of the files.

8. The security monitoring apparatus according to claim 1, wherein the current access corresponds to one of an input from a computer input device, logging-in to equipment, file access, an execution command to operate equipment and access through a network.

9. A security monitoring apparatus for monitoring an input from an input device for monitoring, comprising:

an image inputting unit to input image information from the input device for monitoring;

an image log managing unit to accumulate log information of inputted image information, to determine a scope of a time zone of normal image information using accumulated log information, and to store the scope of the time zone as security management information;

a security checking unit to check whether current image information is different from the normal image information, by comparing a time of log information of the current image information with the scope of the time zone of said security management information, and to determine that the current image information is different from the normal image information if the time of the current image information is not included in the scope of the time zone; and an abnormality alarming unit to issue an alarm if the current image information is different from the normal image information.

10. A security monitoring apparatus for monitoring an input from an input device for monitoring, comprising:

a voice inputting unit to input voice information from the input device for monitoring;

a voice log managing unit to accumulate and manage log information of inputted voice information, to determine a scope of a time zone of normal voice information using accumulated log information, and to store the scope of the time zone as security management information representing past voice input situations;

a security checking unit to check whether current voice information is different from the normal voice information, by comparing a time of log information of the current voice information with the scope of the time zone of the security management information, to determine that the current voice information is different from the normal voice information if the time of the current voice information is not included in the scope of the time zone; and an abnormality alarming unit to issue an alarm if the current voice information is different from normal voice information.

11. A security monitoring method for monitoring access to electronic equipment from outside, comprising acquiring an access log concerning an access situation at a time of access;

accumulating acquired access logs, to calculate a statistical distribution of a plurality of access times in accumulated access logs, to determine a scope of a time zone of a normal access using a mean value and a variance of the statistical distribution, and to store the scope of the time zone as security management information;

checking whether a current access is different from the normal access, by comparing an access time of an access log of the current access with the scope of the time zone of the security management information;

determining that the current access is different from the normal access if the access time of the current access is not included in the scope of past access the time zone; and issuing an alarm if the current access is different from the normal access.

12. A computer-readable storage medium on which is recorded a program for causing a computer to monitor access to electronic equipment from outside, said program enabling the computer to perform a method comprising:

acquiring an access log concerning an access situation at a time of access;

accumulating acquired access logs, to calculate a statistical distribution of a plurality of access times in accumulated access logs, to determine a scope of a time zone of a normal access using a mean value and a variance of the statistical distribution, and to store the scope of the time zone as security management information;

checking whether a current access is different from the normal access, by comparing an access time of an access log of the current access with the scope of the time zone of the security management information and determining that the current access is different from the normal access if the access time of the current access is not included in the scope of the time zone.

* * * * *

UNITED STATES PATENT AND TRADEMARK OFFICE
CERTIFICATE OF CORRECTION

PATENT NO.    : 6,711,687 B1
DATED         : March 23, 2004
INVENTOR(S)   : Minori Sekiguchi It is certified that error appears in the above-identified patent and that said Letters Patent is hereby corrected as shown below:

<u>Column 14,</u>
Line 34, insert -- the -- before normal.

<u>Column 16,</u>
Line 12, insert -- : -- after comprising
Line 28, delete "past access"

Signed and Sealed this

First Day of June, 2004

JON W. DUDAS
*Acting Director of the United States Patent and Trademark Office*